United States Patent [19]

Shikler

[11] Patent Number: 5,329,947
[45] Date of Patent: Jul. 19, 1994

[54] COSMETIC BAG FOR HANGING ON THE SUN VISOR OF AN AUTOMOBILE

[75] Inventor: Arie Shikler, Sherman Oaks, Calif.

[73] Assignee: Auto-Shade, Inc., Moorpark, Calif.

[21] Appl. No.: 971,938

[22] Filed: Nov. 5, 1992

[51] Int. Cl.⁵ ............................ A45D 33/00; B60R 7/00
[52] U.S. Cl. ................................... 132/304; 132/314; 132/316; 132/291; 206/581; 224/312
[58] Field of Search ............... 132/291, 295, 301, 304, 132/312, 314, 315, 316; 224/312; 206/823, 581

[56] References Cited

U.S. PATENT DOCUMENTS

| | | | |
|---|---|---|---|
| 1,111,397 | 9/1914 | Miller | 132/295 |
| 1,919,012 | 7/1933 | Diskin | 132/312 |
| 2,148,557 | 2/1939 | Hook | 132/315 |
| 2,604,133 | 7/1952 | Knee | 206/581 |
| 2,707,072 | 4/1955 | Sims | 224/312 |
| 2,931,114 | 4/1960 | Peterson | 224/312 |
| 3,430,299 | 3/1969 | Copen | 224/312 |
| 4,461,332 | 7/1984 | Parkhurst | 206/581 |
| 4,643,544 | 2/1987 | Loughran | 350/615 |
| 4,844,311 | 7/1989 | Kalen | 224/312 |

FOREIGN PATENT DOCUMENTS

| | | | |
|---|---|---|---|
| 195588 | 2/1958 | Austria | 224/312 |
| 4035553 | 7/1991 | Fed. Rep. of Germany | 132/301 |

Primary Examiner—Gene Mancene
Assistant Examiner—Todd E. Manahan
Attorney, Agent, or Firm—Blakely, Sokoloff, Taylor & Zafman

[57] ABSTRACT

An insulated cosmetic case which can be attached to the visor of an automobile. The inside of the case contains a mirror and compartments that readily provide access to cosmetics that can be conveniently applied while the user is sitting in the passenger compartment of a car. The case has a first portion that is coupled to a second portion by a hinge, which allows the portions to be moved between a folded position and an unfolded position. Each portion contains a pocket constructed to hold a number of cosmetic items. The case has a hanging strap and dual zippers that can secure the first and second portions of the case in the folded position. The hanging strap has an aperture which can be attached to a hook or other similar structure. The cosmetic case also has a pair of outer straps adapted to attach the case to the visor of an automobile.

3 Claims, 2 Drawing Sheets

COSMETIC BAG FOR HANGING ON THE SUN VISOR OF AN AUTOMOBILE

BACKGROUND OF THE INVENTION

1. Field of the Invention

The present invention relates to a cosmetic case.

2. Description of Related Art

When traveling on an extended road trip, the occupants of an automobile typically store cosmetics and other items in the trunk of the car. The trunk of a car can become hot and possibly melt some of the cosmetics. Even if the cosmetics are carried in the interior of the car, the temperature of the passenger compartment may become elevated, especially if the automobile is parked in a hot environment. It would therefore be desirable to have a portable insulated cosmetic case.

The application of cosmetics usually requires a mirror. Passengers who use cosmetics typically carry the cosmetic items and a mirror in a purse which is kept in the passenger compartment of the car. When applying cosmetics, the passenger typically holds the mirror with one hand, while the cosmetics are applied with the other hand. Such a procedure requires a certain amount of coordination on the part of the passenger. Additionally, the purse may contain a number of items, such that the passenger is constantly searching through their purse to find the right cosmetic. It would therefore be desirable to have a cosmetic case that is insulated and allows the passenger to conveniently apply cosmetics within the passenger compartment of a car.

SUMMARY OF THE INVENTION

The present invention is an insulated cosmetic case which can be attached to the visor of an automobile. The inside of the case contains a mirror and compartments that readily provide access to cosmetics that can be conveniently applied while the user is sitting in the passenger compartment of a car. The case has a first portion that is coupled to a second portion by a hinge, which allows the portions to be moved between a folded position and an unfolded position.

Each portion contains a pocket constructed to hold a number of cosmetic items. The mirror is detachably connected to the case, and located so that the mirror is at eye level when the case is unfolded and attached to the visor of a car. The case has a hanging strap that can secure the first and second portions of the case in the folded position. The hanging strap has an aperture which can be attached to a hook or other similar structure. The cosmetic case also has a pair of outer straps adapted to attach the case to the visor of an automobile.

Therefore it is an object of the present invention to provide a cosmetic case which can be attached to a visor or other structure so that the user can conveniently apply cosmetics contained within the case.

It is also an object of the present invention to provide an insulated cosmetic case.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
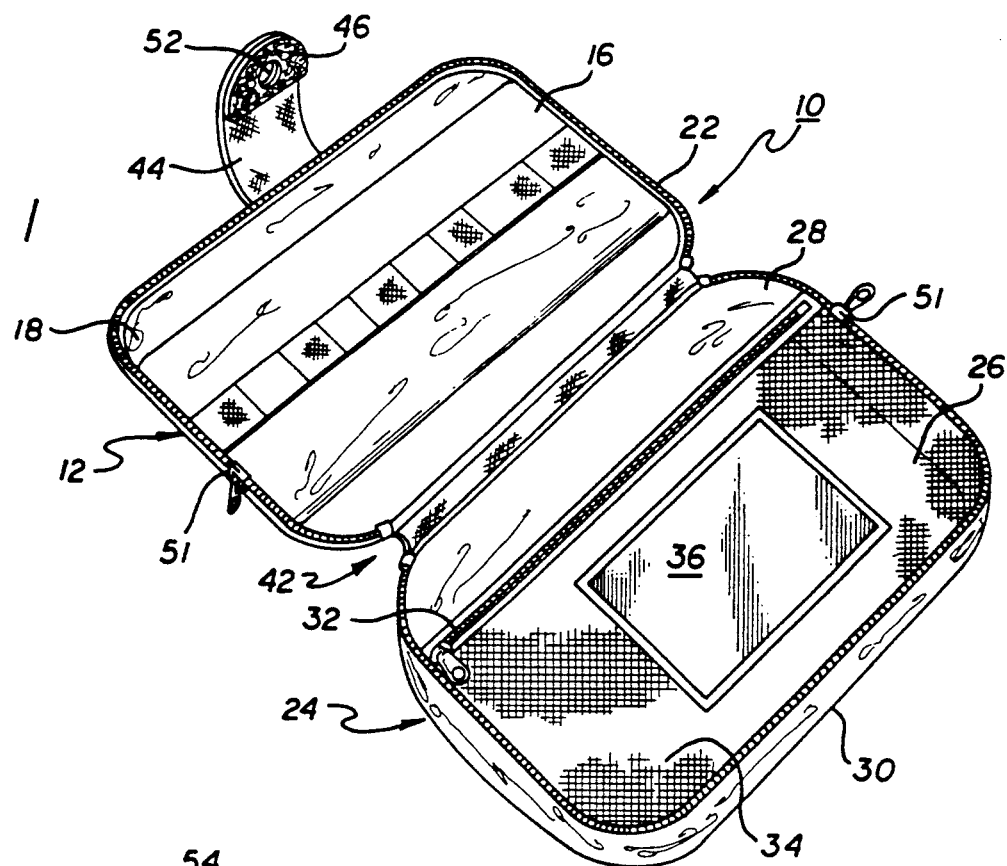
FIG. 1 is a front view of a cosmetic case of the present invention shown in an unfolded portion.

Referring to the drawings more particularly by reference numbers, FIG. 1 shows a cosmetic case 10 of the present invention. The case 10 is typically small enough to carry in the hand of a user and is preferably used to carry cosmetic items. Although the storage of cosmetics is described, it is to be understood that the case 10 can be used to hold other non-cosmetic items.

The case 10 has a first portion 12 which contains a first pocket 14 formed by a first front pocket wall 16 and a first back pocket wall 18. The first portion 12 has a pair of strips 20 constructed from hook and loop material. The strips 20 allow the user to close the first pocket 14 by attaching the front wall 16 to the back wall 18. The first portion 12 may also include a trim 22 that is attached to the front wall 16 to improve the appearance of the case 10.

The case 10 also has a second portion 24 which contains a second pocket 26. The second pocket 26 is formed by a second front pocket wall 28 and a second back pocket wall 30. The front wall 28 contains a zipper 32 which can enclose the second pocket 26. The lower portion 34 of the front wall is typically constructed from a porous material which provides ventilation and allows the user to view the contents of the pocket 26. The remaining walls and wall portions are preferably constructed from a vinyl material, which is easy to clean and maintains the contents of the pockets relatively cool.

Figure 1A:
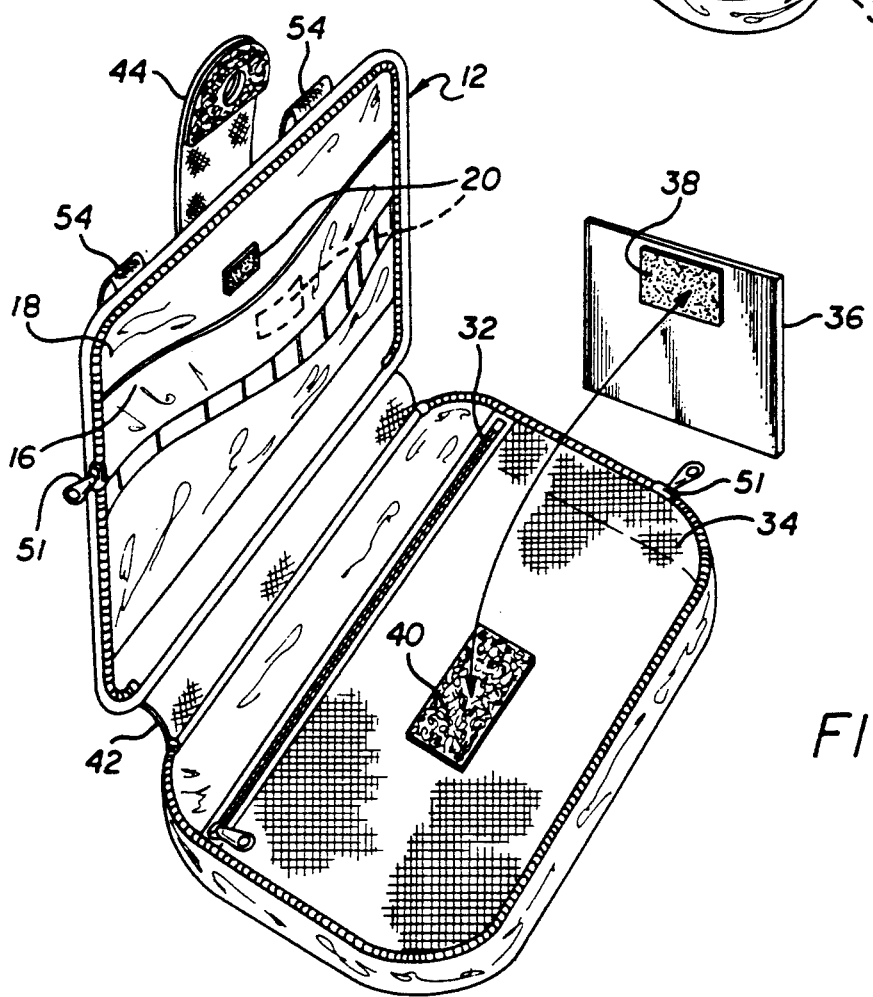
FIG. 1a is an exploded view showing a mirror that is coupled to the cosmetic case by a pair of pads constructed from hook and loop material.

The case 10 includes a mirror 36 that is located on the front wall 28 of the second portion 24. As shown in FIG. 1a, the mirror 36 has a pad 38 of loop material which can mate with a pad 40 of hook material. The hook and loop material allows the user to easily remove the mirror 36 from the wall 28, so that the mirror 36 can be used independently of the case 10.

Figures 2A, 2B:
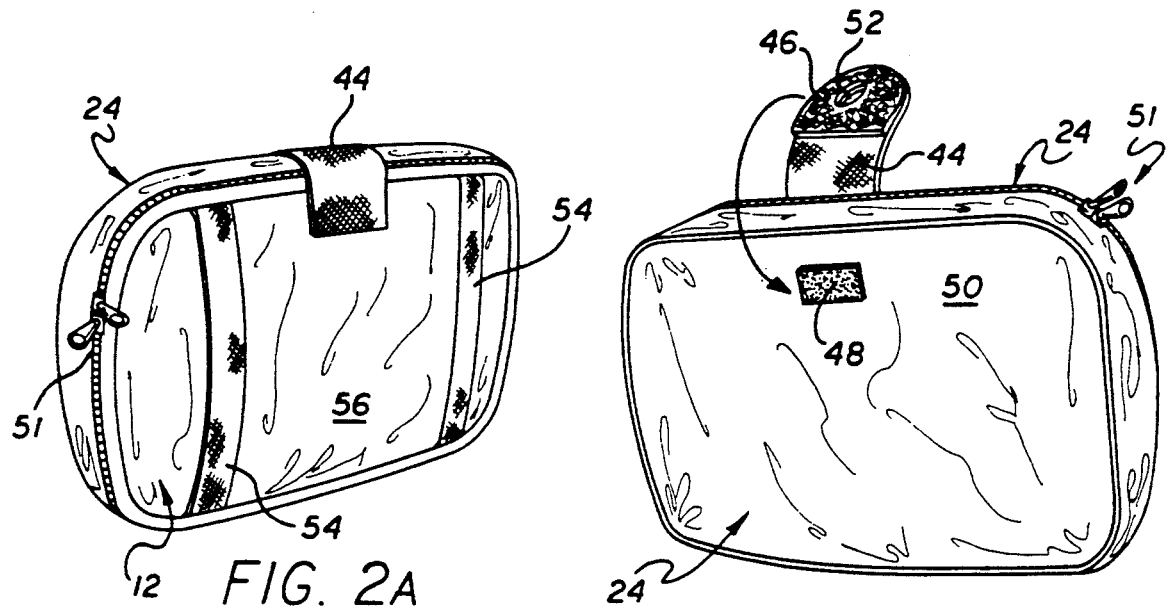
FIG. 2A is a perspective view of the case of FIG. 1 shown in a folded position.
FIG. 2B is a front perspective view of the case shown in a folded position.

The first portion 12 is coupled to the second portion 24 by a hinge 42. As shown in FIG. 2, the hinge 42 allows the first portion 12 to be folded on top of the second portion 24 so that the case 10 is in a folded position. Extending from the first portion 12 is a hanging strap 44 that has hook material 46 which can mate with loop material 48 located on an outer wall 50 of the second portion 24. The strap 44 secures the first 12 and second 24 portions in the folded position. Additionally, the case' may have a pair of zippers 51 that attach the first portion 12 to the second portion 24. The hanging strap 44 may have an aperture 52 that allows the case to be hung from a hook or other similar structure.

Figure 3:
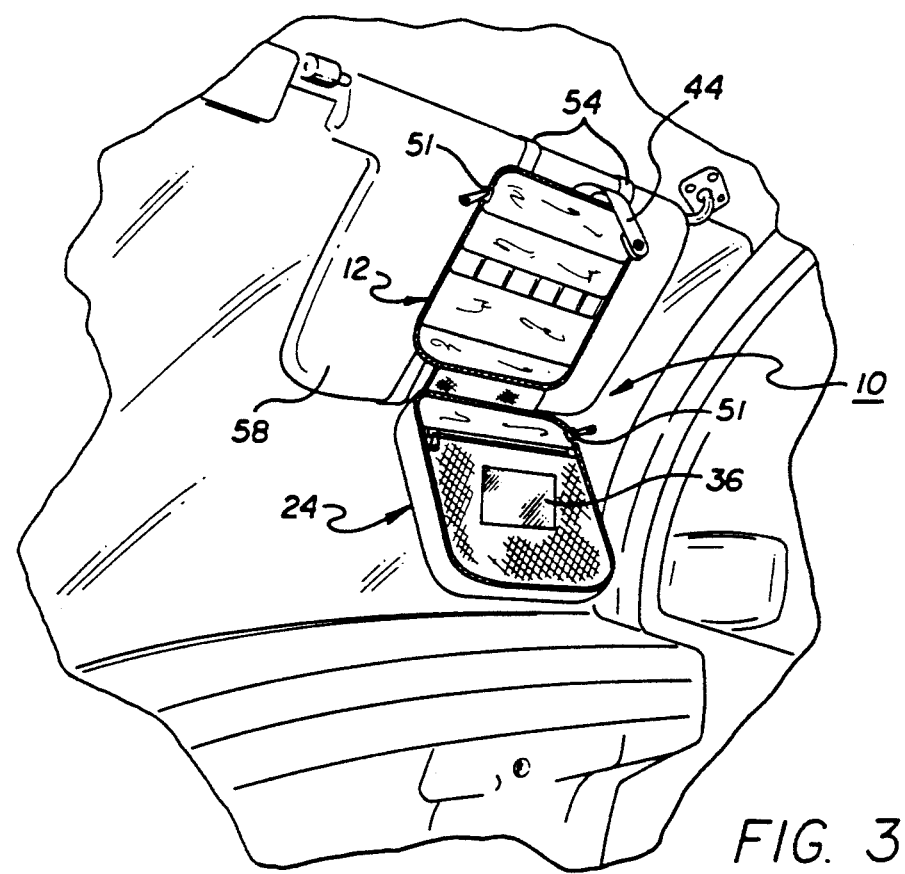
FIG. 3 is a perspective view of the case of FIG. 1 attached to the visor of an automobile.

The case 10 has a pair of outer straps 54 attached to an outer wall 56 of the first portion 12. As shown in FIG. 3, the straps 54 are adapted to receive the visor 58 of an automobile. When the case 10 is attached to the visor, cosmetics can be applied by merely separating the hanging strap 44 from the outer surface 50 of the second portion 24. The pockets 14 and 26 provide easy access to the cosmetics. The mirror 36 is typically located near the user's face so that the cosmetics can be easily applied by the user. Although the application of cosmetics is described, it is to be understood that the case 10 can be used for other purposes. For example, the case 10 can be opened to provide access to the mirror 36 so that the user may merely check their appearance.

The outer walls 50 and 56 are preferably constructed from a reflective or non-reflective vinyl material. The outer material is typically separated from the inner vinyl walls by a foam which creates an insulative layer. The insulative walls reduces the amount of heat transferred from the ambient to the items stored within the case 10. The present invention therefore allows the user to store cosmetics in the case 10 and expose the case 10 to elevated temperatures without melting the cosmetics.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A cosmetic case that can be attached to the visor of an automobile, comprising:

a first portion that has a first pocket and an outer wall constructed from an insulative material, said first pocket including strips of hook and loop material adapted to close said first pocket;

a second portion that has an outer wall constructed from an insulative material, said second portion being coupled to said first portion by a hinge which allows said first and second portions to be folded into a folded position such that said first portion is adjacent to said second portion, said second pocket further having a second pocket which includes a porous wall and a zipper that can enclose said second pocket;

a mirror that has a pad of loop material that mates with a pad of hook material located on said porous wall;

a hanging strap attached to said first portion, said hanging strap having hook material that mates with loop material located on said outer wall of said second portion so that said first and second portions can be secured in said folded position; and, a pair of outer straps attached to said outer wall of said first portion, said outer straps being adapted to receive the visor.

2. The cosmetic case as recited in claim 1, further comprising a pair of zippers adapted to secure said first and second portions in said folded position.

3. A cosmetic case as recited in claim 1, wherein said hanging strap has an aperture.

* * * * *